Patented Mar. 20, 1923.

1,449,134

UNITED STATES PATENT OFFICE.

ALFRED WOHL, OF DANZIG-LANGFUHR, FREE CITY OF DANZIG, ASSIGNOR TO THE FLEISCHMANN COMPANY, OF NEW YORK, N. Y., A CORPORATION OF OHIO.

METHOD OF TREATING MOLASSES.

No Drawing.   Application filed August 31, 1921. Serial No. 497,323.

*To all whom it may concern:*

Be it known that I, ALFRED WOHL, residing at Danzig-Langfuhr, Free City of Danzig, have invented certain new and useful Improvements in Methods of Treating Molasses (for which applications for patent were filed as follows: France, filed on June 11th, 1920; Denmark, filed on June 11th, 1920; United States of America, filed on June 23d, 1920; Czechoslovakia, filed on June 25th, 1920; Canada, filed on July 10th, 1920; Spain, filed on July 14th, 1920; Rumania, filed August 6th, 1920; Germany, filed April 6th, 1920), of which the following is a specification.

This invention relates to a method of treating molasses with a view to its later utilization in the fermentation industries and more particularly relates to a method of clarifying molasses while in a fairly concentrated state and by heating only to a relatively low temperature, with a view to the propagation of yeast of good keeping qualities, color and baking strength, therein.

An object of this invention is to accomplish such clarification and sterilization of molasses by an efficient method which is commercially practicable and easily carried out with a minimum of time, labor and cost.

Another object is to obviate the long, expensive, and tedious boiling commonly practiced.

Other objects will be in part obvious and in part pointed out hereinafter.

The invention accordingly consists in the several steps and the relation and order of one or more of such steps with respect to each of the others thereof, which will be exemplified in the hereinafter disclosed method and the scope of the application of which will be indicated in the claims that follow.

The methods heretofore employed for producing compressed yeast from molasses are based upon the assumption previously existing that a boiling of an acidulated solution of molasses is necessary, both for the purpose of inverting the sugar and separating the constituents difficult of solution, and for sterilizing the molasses. Although the first effect, that of inverting the sugar, is accomplished by boiling acidulated molasses, it is known that sugars are inverted by certain enzymes in yeast. However, for the purpose of sterilization, boiling has been considered to be essential.

I have found that compressed yeast of good keeping qualities and answering all requirements of a good bakers' yeast can be produced from molasses and ammonium salts without further organic nitrogenous foods, without lactic acid fermentation or the addition of lactic acid, and also without boiling, if the molasses, in a moderately concentrated solution, for instance, 30 to 40° Brix, is mixed with large quantities of strong mineral acid and allowed to stand at ordinary temperature or at a gentle heat until sterilization is accomplished. This should be done before any further dilution in order not to use unnecessarily large quantities of acid, which would be required to bring the degree of acidity up to the desired amount, and which would later necessitate the neutralization of a large portion of the acid.

As an example, the quantity of mineral acid necessary, is that which will be sufficient to acidify the subsequent solution of molasses up to the strength needed for producing yeast of good quality without souring by the addition or formation of lactic acid. For instance, I find that to every 100 parts by weight of molasses, about 2 parts by volume of concentrated sulphuric acid, which has been preferably previously diluted with a little water, should be used. The difference as compared with the method of acidulation heretofore practiced lies in the fact that these quantities of acid are, in the form of a strong mineral acid, e. g. sulphuric acid or hydrochloric acid, added to the molasses in a relatively high concentration and after they have exercised their sterilizing effect a suitable dilution is effected.

My method of causing the quantities of acid which will afterwards be required for acidifying the highly diluted fermentative or yeast wort, to act prior to the final dilution of the molasses also allows a further step which improves the hitherto exceedingly inefficient utilization of the mineral phosphoric acid and phosphates as yeast foods.

If phosphoric acid is added, as is usually the case, as super-phosphate, a considerable proportion of the phosphoric acid always remains unused. I overcome this inefficiency by first strongly heating together the super-phosphate and the mineral acid intended for the acidulation of molasses, then adding the mixture to the molasses and heating in the manner hereinbefore described, whereby the molasses is not only sterilized but phosphoric acid is obtained in a form which is readily assimilable by yeast.

When super-phosphate and sulphuric acid are treated as above described, gypsum (calcium sulphate) is formed by their reaction and this is later disseminated throughout the acidified solution of molasses. Since calcium sulphate readily combines with sulphate of potassium to form calcium-potassium sulphate, the calcium sulphate combines with the potassium salts present in the molasses to form insoluble calcium-potassium sulphate which accordingly separates from the molasses and accomplishes in a simple and efficient manner, the reduction of the amount of potassium salts in the molasses. This decrease or reduction in the amount of potassium salts present in the molasses may be increased by the addition of more gypsum to the concentrated and acidulated molasses.

Moreover when super-phosphate is treated with sulphuric acid as above described, some calcium sulphate is precipitated out, and this precipitate may be separated from the liquid if desired, but preferably the liquid and precipitate are both added to the molasses whereby the clarifying effect of the precipitate is utilized. In the former case, special measures are necessary for the practical clarification of the molasses solution. This may be done by allowing the bulk of the deposit to settle and filtering the pre-clarified solution through a flat filter or a sand filter. From the constituents rich in slime, there are then obtained, by means of a centrifugal separator, further quantities of liquid, poor in slime and hence easily filtered, which liquid is then clarified in the above manner. The mud residue can be drawn off with acidulated water and centrifuged or can be used for the manufacture of spirit without the production of yeast.

In order to test the sufficiency the above method, separate portions of molasses were inoculated with traces of two mildew fungi (Mucor and Aspergillus) and two bacteria (*Bacterium lactis* and *butyricum*), and allowed to stand for 8 days at 25° C. From these portions a solution of 30° Brix was made at ordinary temperature, with the addition of acid as indicated; a second solution without an addition of acid was also taken. These solutions were tested after 24 hours, as to the number of micro-organisms present therein, by inoculation upon nutrient gelatine. The first solution was found to be entirely sterile whereas the second solution contained on the average of 1800 organisms per cubic centimeter.

As many changes could be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention, which, as a matter of language, may be said to fall therebetween.

This application is a continuation of certain subject-matter originally disclosed in my co-pending application, Serial No. 391,156, filed June 23, 1920.

Having described my invention, what I claim as new and desire to secure by Letters Patent is:

1. The method of treating molasses which comprises adding thereto a mineral acid and a phosphate.

2. The method of treating molasses which comprises, adding thereto a mineral acid and a phosphate, and heating the mixture moderately.

3. The method treating molasses which comprises, adding thereto a mixture of a mineral acid and a phosphate, heating the final mixture until a precipitate is formed, and separating the precipitate from the liquid.

4. The method of preliminary treatment of molasses for use in the fermentation industries which comprises, treating a phosphate with an excess of mineral acid, heating the same, adding the resultant mixture to the molasses, and heating the final mixture until a precipitate is formed.

5. The method of preliminary treatment of molasses for use in the fermentation industries which comprises, treating a phosphate with an excess of mineral acid, heating the same, adding the resultant mixture to the molasses, heating the final mixture until a precipitate is formed, and separating the precipitate from the liquid.

6. The method of preliminary treatment of molasses for use in the fermentation industries which comprises, treating a phosphate with an excess of a mineral acid, and adding the resultant mixture to the molasses.

7. The method of preliminary treatment of molasses for use in the fermentation industries which comprises, treating a phosphate with an excess of a mineral acid, heating the same, and adding the resultant mixture to the molasses.

8. The method of preliminary treatment of molasses for use in the fermentation industries which comprises, heating an excess of mineral acid with a phosphate until a precipitate is formed, adding the mixture to the molasses, and heating moderately.

9. The method of preliminary treatment of molasses for use in the fermentation industries which comprises, heating an excess of mineral acid with a phosphate until a precipitate is formed, separating the precipitate from the liquid, adding the liquid to the molasses, and heating the final mixture moderately.

10. The method of preliminary treatment of molasses for use in the fermentation industries which comprises, heating an excess of mineral acid with a super-phosphate until a precipitate is formed, and adding the mixture to the molasses.

11. The method or preliminary treatment of molasses for use in the fermentation industries which comprises, heating an excess of mineral acid with a super-phosphate until a precipitate is formed, adding the mixture to the molasses, and heating moderately.

12. The method of preliminary treatment of molasses for use in the fermentation industries which comprises, heating an excess of mineral acid with a super-phosphate until a precipitate is formed, separating the precipitate from the liquid, and adding the liquid to the molasses.

13. The method of preliminary treatment of molasses for use in the fermentation industries which comprises, heating an excess of mineral acid with a super-phosphate until a precipitate is formed, separating the precipitate from the liquid, adding the liquid to the molasses, and heating the final mixture moderately.

14. In the art of yeast manufacture, the steps in the preparation of a yeast nutrient solution which comprise, preparing a moderately concentrated solution of molasses, treating a super-phosphate with a mineral acid, heating the latter mixture until a precipitate is formed, adding the resultant mixture to the molasses solution, moderately heating the final mixture until a precipitate is formed, and separating the precipitate from the liquid.

15. In the art of yeast manufacture, the steps in the preparation of a yeast nutrient solution which comprise, preparing a moderately concentrated solution of molasses, adding thereto a mixture of a mineral acid and a phosphate, and treating the resultant mixture in such a manner that a portion of the mineral salts, originally present in the molasses, combine with the materials added to the molasses to form an insoluble salt which may be readily separated from the molasses.

16. In the art of yeast manufacture, the steps in the preparation of a yeast nutrient solution which comprise, preparing a moderately concentrated solution of molasses, adding thereto a mixture of a mineral acid and a phosphate, heating the resultant mixture, whereby a portion of the mineral salts originally present in the molasses, combine with the mixture added to the molasses to form an insoluble salt, and to set phosphoric acid free in a form which is readily assimilable by yeast, and separating the precipitate from liquid.

17. In the art of yeast manufacture, the steps in the preparation of a yeast nutrient solution which comprise, preparing a moderately concentrated solution of molasses and adding thereto such an excess of mineral acid, as will upon final dilution, produce in the resultant yeast nutrient solution an acidity which approximates the optimum for the yeast propagation.

18. In the art of yeast manufacture, the steps in the preparation of a yeast nutrient solution which comprise, preparing a moderately concentrated solution of molasses and adding thereto a phosphate and such an excess of mineral acid, as will upon final dilution produce in the resultant yeast nutrient solution an acidity which approximates the optimum for the yeast propagation.

19. The method of preliminary treatment of molasses for use in the fermentation industries which comprises, acidifying the molasses, adding gypsum thereto, and after a precipitate is formed, separating the precipitate from the liquid.

20. The method of preliminary treatment of molasses for use in the fermentation industries which comprises, acidifying the molasses, adding gypsum thereto, and moderately heating the resultant mixture until a precipitate is formed.

In testimony whereof I affix my signature in presence of two witnesses.

ALFRED WOHL.

Witnesses:
 Howard A. Bourman,
 William M. Robertson.